J. HARRIS.
WELDING ROD.
APPLICATION FILED FEB. 3, 1919.
1,358,311. Patented Nov. 9, 1920.
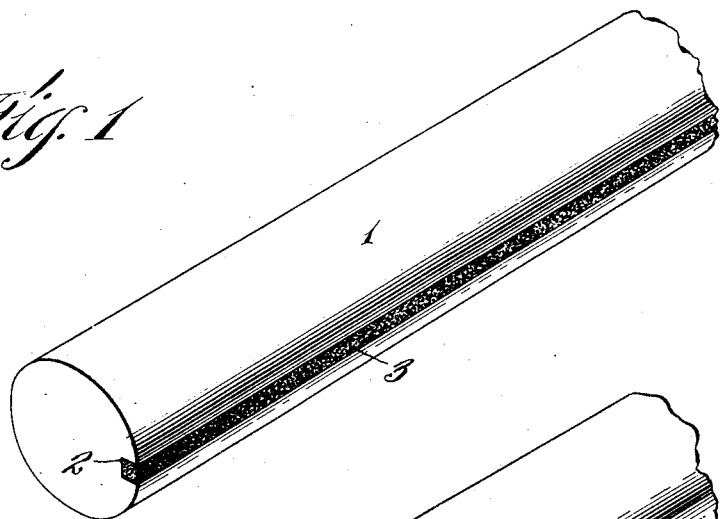
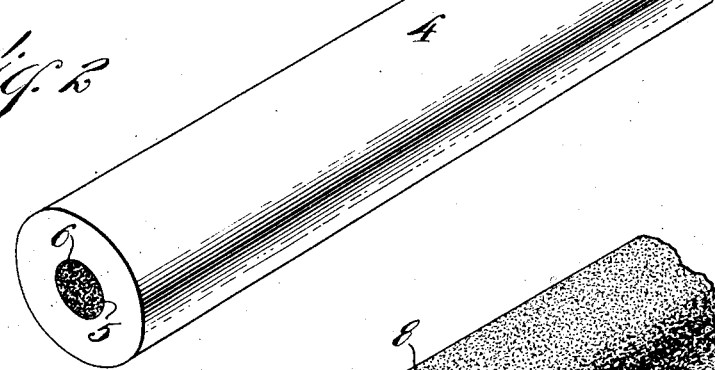
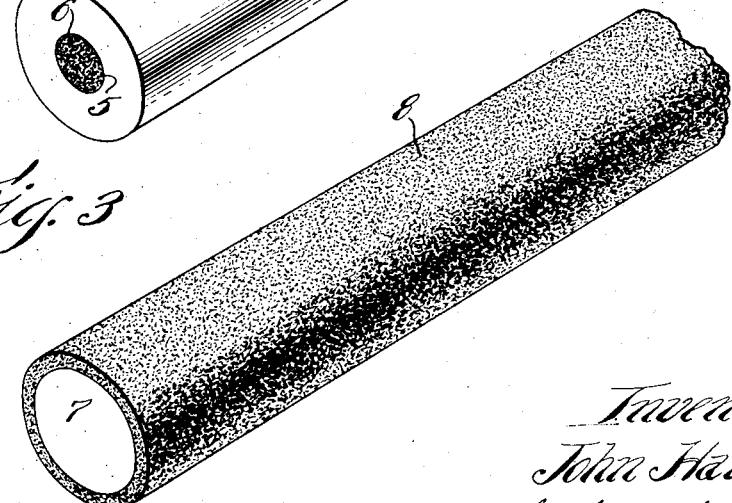
Inventor
John Harris.
By Hull, Smith, Brock & West
Attys.

UNITED STATES PATENT OFFICE.

JOHN HARRIS, OF LAKEWOOD, OHIO, ASSIGNOR OF ONE-HALF TO JAMES R. ROSE, OF EDGEWORTH, PENNSYLVANIA.

WELDING-ROD.

1,358,311.      Specification of Letters Patent.     Patented Nov. 9, 1920.

Application filed February 3, 1919. Serial No. 274,627.

*To all whom it may concern:*

Be it known that I, JOHN HARRIS, a citizen of the United States, residing at Lakewood, in the county of Cuyahoga and State of Ohio, have invented a certain new and useful Improvement in Welding-Rods, of which the following is a full, clear, and exact description, reference being had to the accompanying drawings.

This invention relates to metallic rods employed for the welding of articles such as castings, sheet metal etc. which require fluxes. These rods are introduced, together with the necessary fluxing material, into a heated welding zone, produced by a welding torch or arc, the molten metal, produced by the fusion of the rod with the flux, serving to form the welded joint between the adjacent edges of the article operated upon.

It is the purpose of my invention to provide a rod having the flux associated therewith in such manner as will permit the welding operation to be conducted continuously and with greater efficiency, speed, and economy than has been possible heretofore. In the embodiment of my invention shown in Figures 1 and 2 herein, I accomplish this result by forming the rod (either a solid or a tubular rod) with a recess, this recess being of sufficient cross-sectional area to receive therewithin fluxing material in the proper proportion to enable the rod to be fused and the welding operation to be effected continuously and without the necessity for removing the rod from the zone of heat and dipping the end thereof into the fluxing material from time to time, as is the general practice.

In the drawings forming part hereof, Fig. 1 represents a perspective view of a solid rod and Fig. 2 a similar view of a hollow or tubular rod constructed in accordance with my invention; and Fig. 3 a similar view of a modification of my invention.

In Fig. 1, 1 denotes the rod, which may be of iron, Tobin bronze, brass, aluminum, manganese, or other suitable material. This rod is provided with a slot 2 extending longitudinally thereof, said slot having the fluxing material 3 therein. In practice, this fluxing material may be applied to the slot either by pressing it into the same, or by first melting the material and dipping the rod into the molten flux, thus filling the slot. The fluxing material may be that ordinarily employed for welding operations, such as manganese flux, or brass or bronze flux.

In Fig. 2 the rod 4 is shown as a tubular rod having the interior 5 filled with the fluxing material 6. Instead of applying the fluxing material to the rod by slotting the same or by filling the interior of a hollow rod, I may apply the coating by dipping the rod into the molten material. This embodiment of my invention is shown in Fig. 3 wherein 7 denotes a rod having an external coating 8 of the fluxing material applied in the manner described. The advantage of applying the fluxing material in this manner resides in the fact that the material provides a protective coating for the rod to prevent oxidation of the same.

Where the molten material is applied to the rod shown in Figs. 1 and 2 by the dipping operation, there may be some excess of such material; this, however, does not interfere with the welding operation. By pressing the material into the slot of the solid rod and into the interior of the hollow rod, only sufficient material need be incorporated with the rod for the welding operation, thus economizing in the use of such material. The same is true as to the mode of incorporating the fluxing material shown in Fig. 3.

As the welding operation has been conducted heretofore, the end of the welding rod is dipped into the flux from time to time, this end being introduced into the welding zone and the molten metal resulting from the fusion of the rod and flux being applied to the slot or space between the walls to be united. This dipping operation must be repeated at frequent intervals and there is no proportioning of the fluxing material to the metal of the rod. Furthermore, inserting a mass of this material into the welding zone results in the blowing away of a large proportion of the material, with attendant waste. In the use of my invention, the rod itself carries the flux and this flux is evenly distributed throughout the length of the rod, enabling the rod, together with the proper proportion of flux, to be presented to the welding zone, and without any interruption whatever of the welding operation for the purpose of adding fluxing material from time to time. By the use of a rod thus prepared, I am not only enabled to save a great deal of time in the welding operation, but I am enabled to effect a more uniform and homogeneous weld, due to the fact that at all times the portion of the rod subjected to the welding zone has associated therewith the proper proportion of flux to secure maximum efficiency.

The welding rods, prepared in the manner specified herein, may be sold to the trade with the fluxing material incorporated therewith. Where the fluxing material is pressed into a slot of a solid rod or into the interior of a hollow rod, the flux may have incorporated therewith a suitable binding agent which will enable it to adhere to the rod. This material may be any well known binding material which will not be detrimental to the welding operation, such, for instance, as silicate of sodium or silicate of potassium.

Having thus described my invention, what I claim is:—

1. A welding rod having a recess therein, and a mixture of fluxing material with a silicate of an alkali metal within said recess and distributed substantially uniformly throughout the same.

2. A welding rod having a mixture of fluxing material with a silicate of an alkali metal permanently associated therewith and distributed substantially uniformly throughout its length.

In testimony whereof I hereunto affix my signature.

JOHN HARRIS.